United States Patent
Hano et al.

(10) Patent No.: US 9,729,091 B2
(45) Date of Patent: Aug. 8, 2017

(54) SENSORLESS DRIVING APPARATUS AND SENSORLESS DRIVING METHOD FOR BRUSHLESS MOTOR

(71) Applicant: Hitachi Automotive Systems, Ltd., Hitachinaka-shi, Ibaraki (JP)

(72) Inventors: Masaki Hano, Isesaki (JP); Yoshitaka Iwaji, Hitachi (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 371 days.

(21) Appl. No.: 14/025,358

(22) Filed: Sep. 12, 2013

(65) Prior Publication Data
US 2014/0084824 A1    Mar. 27, 2014

(30) Foreign Application Priority Data
Sep. 21, 2012 (JP) .................. 2012-207922

(51) Int. Cl.
*H02P 6/00* (2016.01)
*H02P 6/14* (2016.01)
*H02P 6/18* (2016.01)

(52) U.S. Cl.
CPC .............. *H02P 6/14* (2013.01); *H02P 6/181* (2013.01)

(58) Field of Classification Search
CPC ..... H02P 2005/4007; H02P 2005/4013; H02P 6/18; H02P 2007/056; H02P 2007/6204; H02P 21/0039; H02P 25/083
USPC ....................... 318/400.32, 400.26
See application file for complete search history.

(56) References Cited

U.S. PATENT DOCUMENTS

| | | | | |
|---|---|---|---|---|
| 3,999,108 | A | * 12/1976 | Tanikoshi | ............... H02P 6/06 318/400.04 |
| 6,400,107 | B1 | 6/2002 | Nakatani et al. | |
| 8,269,439 | B2 | * 9/2012 | Itoh | ..................... H02M 7/00 318/400.02 |
| 2002/0109479 | A1 | * 8/2002 | Kishibe | ............ B60L 11/1807 318/811 |
| 2007/0018599 | A1 | 1/2007 | Yamamoto et al. | |

(Continued)

FOREIGN PATENT DOCUMENTS

| | | |
|---|---|---|
| JP | 2003-111483 A | 4/2003 |
| JP | 2004-88907 A | 3/2004 |
| JP | 2009-189176 A | 8/2009 |

OTHER PUBLICATIONS

Japanese Office Action issued in counterpart Japanese Application No. 2012-207922 dated Dec. 1, 2015, with English translation (four (4) pages).

*Primary Examiner* — Bickey Dhakal
(74) *Attorney, Agent, or Firm* — Crowell & Moring LLP

(57) ABSTRACT

The present relates to a sensorless driving apparatus and a sensorless driving method for a brushless motor. In a state that the brushless motor is driven by rectangular waves, when the driving apparatus detects that a rotation speed of the brushless motor becomes higher than a predetermined speed and thereafter it detects that an angle of a rotor of the brushless motor becomes a predetermined angle, the driving apparatus switches the drive from rectangular wave drive to sign wave drive. The driving apparatus sets as the predetermined angle an angle at which energizing mode is switched in the rectangular wave drive or an angle at which a motor torque is at a peak value in the rectangular wave drive.

18 Claims, 6 Drawing Sheets

(56) References Cited

U.S. PATENT DOCUMENTS

2009/0200971 A1\* 8/2009 Iwaji .................. H02P 6/20
                                                    318/400.11
2010/0283416 A1\* 11/2010 Onishi ................ H02P 6/28
                                                    318/400.09

\* cited by examiner

SENSORLESS DRIVING APPARATUS AND SENSORLESS DRIVING METHOD FOR BRUSHLESS MOTOR

BACKGROUND OF THE INVENTION

1. Field of the Invention

The present invention relates to a driving apparatus that drives a brushless motor in a sensorless manner while performing switching between rectangular wave drive and sign wave drive, and to a driving method therefor.

2. Description of Related Art

As a driving method for a brushless motor, in addition to a sign wave drive, a rectangular wave drive is known. The rectangular wave drive is a driving method of determining, among three phases of a brushless motor, a phase for carrying out PWM control, a phase for outputting high signal and a phase for outputting a low signal.

Furthermore, for example, Japanese Laid-open (Kokai) Patent Application Publication No. 2009-189176 discloses a method for achieving these driving methods without employing a sensor for detecting the angle of a rotor.

In such a sign wave drive, it is possible to obtain angle information of the rotor from an induced voltage produced by rotation of the rotor (in other words, speed-induced voltage). Furthermore, in such a rectangular wave drive, it is possible to obtain angle information of the rotor from a voltage of a non-energized phase induced by application of pulse-shaped voltage to an energized phase (in other words, transformer-induced voltage).

In a sensorless driving apparatus for a brushless motor, there is a case in which drive mode is switched from rectangular wave drive to sign wave drive according to rotation speed of the motor. Here, when the rotation speed of the motor reaches a speed for switching the drive mode within a switching cycle of energizing mode in rectangular wave drive, switching to sign wave drive is performed in a state that the angle of the rotor is unknown.

In the sign wave drive, since position information in shorter angular cycle as compared with a rectangular wave drive is required, if the drive mode is switched to sign wave drive in a state that the angle of rotor is unknown, controllability immediately after the switching is deteriorated, so that loss of synchronism or drop of torque occurs.

SUMMARY OF THE INVENTION

Therefore, in view of the above problems, it is an object of the present invention to provide a sensorless driving apparatus and a sensorless driving method for a brushless motor, which can suppress loss of synchronism or drop of torque immediately after the switching from rectangular wave drive to sign wave drive.

In order to achieve the above object, the sensorless driving apparatus for a brushless motor according to an aspect of the present invention includes: a first drive unit which drives the brushless motor by rectangular waves; a second drive unit which drives the brushless motor by sign waves; and a switching unit which performs switching from the first drive unit to the second drive unit when the angle of a rotor of the brushless motor is a predetermined angle.

Furthermore, the sensorless driving method for a brushless motor according to an aspect of the present invention includes: detecting whether or not an angle of a rotor of the brushless motor is a predetermined angle; and switching drive of the brushless motor from a rectangular wave drive to a sign wave drive when the angle of a rotor of the brushless motor is the predetermined angle.

Other objects and features of aspects of the present invention will be understood from the following description with reference to the accompanying drawings.

DESCRIPTION OF PREFERRED EMBODIMENTS

Figure 1:
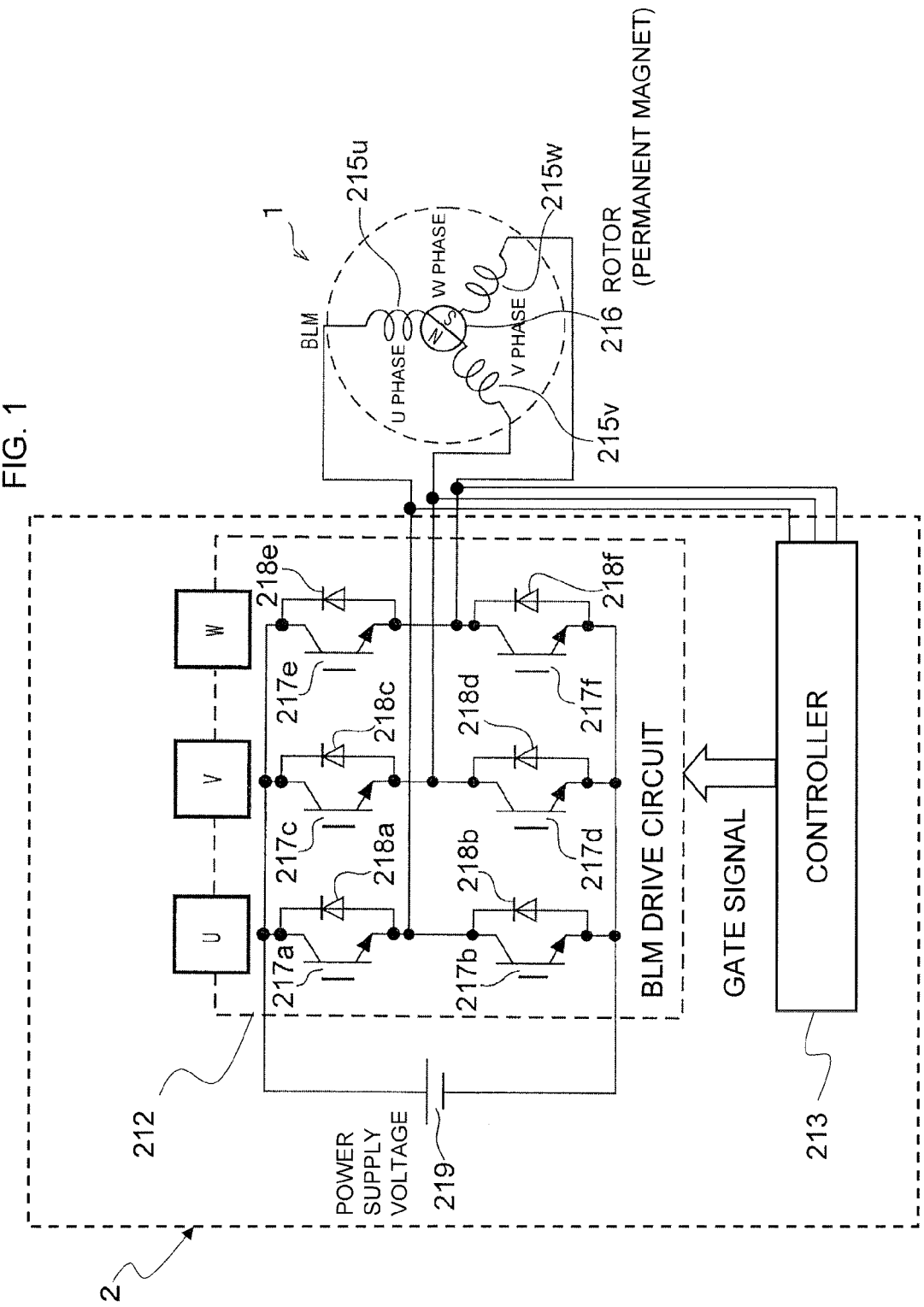
FIG. 1 is a circuit block diagram illustrating the construction of a driving apparatus and a brushless motor according to an embodiment of the present invention.

FIG. 1 is a circuit block diagram illustrating the construction of a driving apparatus and a brushless motor according to an embodiment of the present invention.

A brushless motor 1 illustrated in FIG. 1 may, for example, be employed as a power source for an electric fluid pump such as an electric oil pump or an electric water pump in a vehicle.

The driving apparatus 2 illustrated in FIG. 1 is a sensorless driving apparatus which drives brushless motor 1 without using a sensor for detecting the angle of a rotor of brushless motor 1.

A driving apparatus 2 includes a motor driving circuit 212 and a controller 213 provided with a computer.

Brushless motor 1 is a three-phase DC brushless motor, in other words, a three-phase synchronous motor. Three-phase coils 215U, 215V and 215W of U-phase, V-phase and W-phase, respectively, of brushless motor 1 are provided to a cylindrical stator, not illustrated, and a permanent magnet rotor 216 is disposed in a space formed in the central portion of the stator.

Motor driving circuit 212 has a three-phase bridge circuit composed of switching elements 217a to 217f including respective reversed parallel diodes 218a to 218f, and a power supply circuit 219.

Gate terminals of switching elements 217a to 217f are connected to controller 213, and controller 213 controls switching elements 217a to 217f.

Controller 213 is a circuit which computes applied voltages to the phases of brushless motor 1 and produces drive control signals to be output to the driving circuit 212.

Controller 213 detects the angle of rotor 216 (in other words, position of magnetic pole) without using a sensor, and based on the position information, controller 213 controls an applied voltage to each phase to drive brushless motor 1.

Controller 213 switches the drive mode of brushless motor 1 between a sign wave drive mode and a rectangular wave drive mode. The sign wave drive mode is a 180-degree energizing type drive mode outputting sign waves based on position information of rotor 216, while the rectangular wave drive mode is a 120-degree energizing type drive mode determining a phase for carrying out PWM control, a phase for outputting high signal and a phase for outputting low signal.

Here, in the rectangular wave drive, six combination patterns of a phase for performing PWM control, a phase for outputting high signal and a phase for outputting low signal, are set, and an output pattern is sequentially switched at every 60-degree rotation of rotor 216.

Furthermore, in the sign wave drive, controller 213 obtains position information of rotor 216 based on an induced voltage produced by rotation of rotor 216, and in the rectangular wave drive, controller 213 obtains position information of rotor 216 based on a voltage induced in a non-energized phase by a pulse-shaped voltage application to an energized phase, to thereby perform a sensorless drive of brushless motor 1.

Here, in the sign wave drive, controller 213 estimates the position of rotor from the motor rotation speed in a detection cycle of the rotor position based on a speed-induced voltage, and from the estimated position of the rotor and PWM duty cycle, and controller 213 computes output value to each of the three phases.

In the sign wave drive, controller 213 drives brushless motor 1 by performing a vector control in a sensorless manner, for example.

Controller 213 performs drive of brushless motor 1 in the abovementioned sensorless vector control, for example, in the following manner.

Controller 213 receives d-axis detected current Idc, q-axis detected current Iqc and d-axis and q-axis voltage instruction values (Vd* and Vq*), and computes an axial error Δθc that is a position error between a real rotational position (real rotational coordinate axis) and a virtual rotational position (control axis) of the rotor.

Then controller 213 obtains a difference between the axial error Δθc and an axial error instruction value Δθ*, and performs a PLL control that adjusts an inverter frequency instruction value ω1* so that the above difference becomes zero.

Furthermore, controller 213 performs a vector operation using d-axis current instruction value Id*, q-axis current instruction value Iq* and inverter frequency instruction value ω1* to obtain Vd* and Vq*, and performs coordinate-conversion of Vd* and Vq* to output three-phase voltage instruction values (Vu*, Vv*, Vw*).

In the sensorless vector control drive, controller 213 estimates a deviation (axial error) between a real rotor phase angle and a phase angle assumed in the control, and corrects the phase in the control so that the deviation becomes zero, to thereby achieve a sensorless control. Here, controller 213 computes the axial error based on an induced voltage.

In the sign wave drive, since controller 213 obtains position information of rotor 216 based on a speed-induced voltage, when the motor rotation speed is low, the speed-induced voltage drops to deteriorate detection accuracy of position information of rotor 216.

On the other hand, in the rectangular wave drive, controller 213 obtains position information of rotor 216 based on a voltage induced in a non-energized phase by application of pulse-shaped voltage, and accordingly, the position information may be detected even in a region of low motor rotation speed including a stop state.

Thus, controller 213 switches the drive mode between the sign wave drive and the rectangular wave drive based on a region of motor rotation speed in which the position of rotor 216 can be detected with a sufficient accuracy based on a speed-induced voltage, in other words, based on a region of motor rotation speed in which the speed-induced voltage becomes higher than a predetermined voltage. That is, controller 213 performs the sign wave drive in a high speed region in which the rotation speed of brushless motor 1 is higher than a predetermined speed, and performs the rectangular wave drive in a low speed region in which the rotation speed of brushless motor 1 is lower than the predetermined speed.

That is, in this embodiment, the sign wave drive is a sensorless drive mode to be used in a high speed region, and the rectangular wave drive is a sensorless drive mode to be used in a low speed region.

Furthermore, in order to suppress loss of synchronism or drop of torque immediately after the switching from rectangular wave drive to sign wave drive, controller 213 performs the switching from rectangular wave drive to sign wave drive when it is detected that the motor rotation speed is higher than the predetermined speed and that the angle of rotor 216 becomes an angle at which switching of drive mode is to be performed.

In the rectangular wave drive, controller 213 compares the voltage of a non-energized phase with a threshold voltage to detect whether or not the position of rotor 216 is at an angle at which switching of output pattern (energizing mode) is to be performed, and performs the switching of output pattern.

Accordingly, if a switching instruction to sign wave drive based on motor rotation speed is made at an angle between an angle at which the output pattern is switched last time and an angle at which the output pattern is switched next time, although it is clear that the position of rotor 216 is within a switching cycle of output pattern, but controller 213 cannot obtain more detailed position information required for the sign wave drive, and accordingly, loss of synchronism or drop of torque may occur when the sign wave drive is started.

Therefore, controller 213 detects that the motor rotation speed becomes higher than the predetermined speed, waits until the angle of rotor 216 becomes a predetermined angle and thereafter performs switching from the rectangular wave drive to the sign wave drive.

By such a construction, since the angle of rotor 216 at which the switching from rectangular wave drive to sign wave drive is known, controller 213 can obtain position information with an angle cycle smaller than that required in a sign wave drive control, based on the abovementioned known angle and a motor rotation speed at that time.

Accordingly, in controller 213, it is possible to perform a high precision drive control in a period until a first position detection is made based on a speed-induced voltage in the sign wave drive, to thereby suppress loss of synchronism or drop of torque.

For example, in a case in which brushless motor 1 is a motor for driving an oil pimp for a vehicle, when the brushless motor is required to be operated at a low rotation speed for such a reason of oil flow rate requirement, controller 213 operates brushless motor 1 at a low rotation speed in rectangular wave drive.

When it is required to operate brushless motor 1 at a high rotation speed, controller 213 performs switching from rectangular wave drive to sign wave drive. At the time of switching of drive mode, since it is possible to suppress loss of synchronism or drop of torque, it is possible to stably control the rotation speed of brushless motor 1 according to, for example, requirement of oil flow rate, and thus to improve control accuracy of oil flow rate.

Accordingly, when the oil pump is a pump for supplying oil for lubrication or cooling, while suppressing excessive oil flow rate, it is possible to stably obtain an oil flow rate required for lubrication or cooling, and to improve lubrication and cooling performances.

Figure 2:
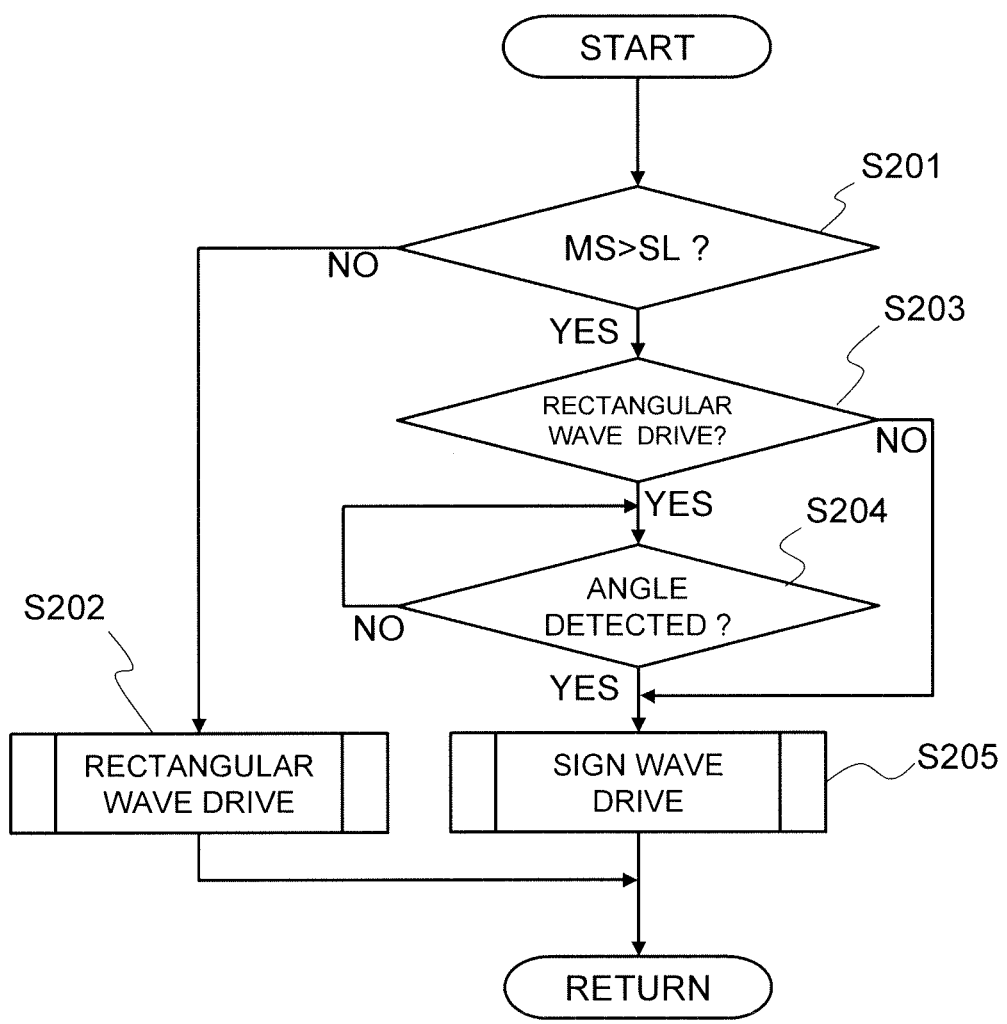
FIG. 2 is a flowchart illustrating an example of a switching process according to an embodiment of the present invention.

FIG. 2 is a flowchart illustrating an example of switching control between rectangular wave drive and sign wave drive by controller 213.

The routine illustrated in FIG. 2 is executed at regular intervals by interruption, and first, in step S201, controller 213 determines whether or not a motor rotation speed MS is higher than a predetermined speed LS. Here, motor rotation speed MS is computed from detection cycle of position information of rotor 216.

The predetermined speed SL is set in advance so as to determine whether or not the position of rotor 216 is detected with a sufficient accuracy based on speed-induced voltage.

Accordingly, when motor rotation speed MS is higher than predetermined speed LS, since the speed-induced voltage is high, it is possible to detect the position of rotor 216 with sufficient accuracy based on the speed-induced voltage. On the other hand, when motor rotation speed MS is lower than predetermined speed LS, since the speed-induced voltage is low, the accuracy of position detection based on the speed-induced voltage is deteriorated, and the sign wave drive cannot be performed.

Therefore, when motor rotation speed MS is lower than predetermined speed LS, the process proceeds to step S202. In S202, controller 213 performs a rectangular wave drive in which position detection is performed based on transformer-induced voltage of a non-energized phase.

In a case of detecting the position of rotor 216 based on a voltage (transformer-induced voltage) induced in a non-energized phase by application of pulse-shaped voltage to an energized phase, it is possible to perform position detection with an accuracy required for rectangular wave drive even in a region of low motor rotation speed.

Thus, in a low speed region from start of brushless motor 1 to a time at which motor rotation speed MS is higher than predetermined speed SL, controller 213 rotates brushless motor 1 by rectangular wave drive.

On the other hand, when motor rotation speed MS is raised from the low speed region in which brushless motor 1 is driven by rectangular wave drive and enters into a high speed region in which motor rotation speed MS is higher than predetermined speed LS, that is, when it enters in a speed region in which position detection can be performed by speed-induced voltage, the process proceeds from step S201 to step S203.

In step S203, controller 203 determines whether or not rectangular wave drive has been selected as a drive mode, and when rectangular wave drive is selected, the process proceeds to step S204.

In step S204, controller 213 determines whether or not an angular position DCA of rotor 216, that has been set in advance as a position at which switching from rectangular wave drive to sign wave drive is to be performed, is detected in rectangular wave drive state.

Then, controller 213 waits until the angle of rotor 213 becomes angular position DCA, and when the angle of rotor 213 becomes angular position DCA, the process proceeds to step S205 to switch the drive mode from rectangular wave drive to sign wave drive.

That is, controller 213 does not immediately switch the drive mode to sign wave drive when motor rotation speed MS becomes higher than predetermined speed LS, and thereafter, when the angle of rotor 216 becomes angular position DCA, controller 213 switches the drive mode to sign wave drive.

Then, in a period from the switching to sign wave drive until a first position detection based on speed-induced voltage is made, controller 213 estimates the position of rotor 216 based on angular position DCA and the motor rotation speed, and sets an output in the sign wave drive.

Accordingly, controller 213 can detect the position of rotor 216 with high accuracy from immediately after the switching to sign wave drive, to drive brushless motor 1 by sign wave drive, and thus, it is possible to suppress loss of synchronism or drop of torque.

In a case in which processes of step S203 and step S204 are not performed, controller 213 switches the drive mode to sign wave drive when motor rotation speed MS is higher than predetermined speed LS.

In the rectangular wave drive, in order to switch output pattern at 60 degree intervals, controller 213 detects the angle at 60 degree intervals, and if rotor rotation speed MS is higher than predetermined speed LS at a position between the position detections, the sign wave drive is started in a state that the angular position of rotor 216 in a 60 degree segment is unknown. In this case, in a period until a first position detection is made based on speed-induced voltage, control performance by controller 213 may be deteriorated to cause loss of synchronism or drop of torque.

In step S205, controller 213 performs sign wave drive, and thereafter, if motor rotation speed MS is continuously higher than predetermined speed LS, it determined that sign wave drive has been selected in step S203, and the process does not proceed to step S204 but proceeds to step S205 to continue the sign wave drive.

Furthermore, when motor rotation speed MS drops from the high speed region in which the sign wave drive is selected and becomes lower than predetermined speed LS, the process proceeds from step S201 to step S202 to switch the drive mode to rectangular wave drive.

In the switching from sign wave drive to rectangular wave drive, since it is required to perform a position detection in sign wave drive with higher resolution than that of rectangular wave drive, even if the drive mode is switched to 120-degree energizing rectangular wave drive when motor rotation speed MS is lower than predetermined speed LS, it is possible to select a proper output pattern from the beginning of the start of the 120-degree energizing rectangular wave drive.

Here, it is possible to perform the switching from sign wave drive to rectangular wave drive at an angular position PCA at which switching to output pattern is to be performed in the rectangular wave drive.

Next, an example of detection of angular position DCA by controller 213 in Step S204 will be explained with reference to FIG. 3.

Figure 3:
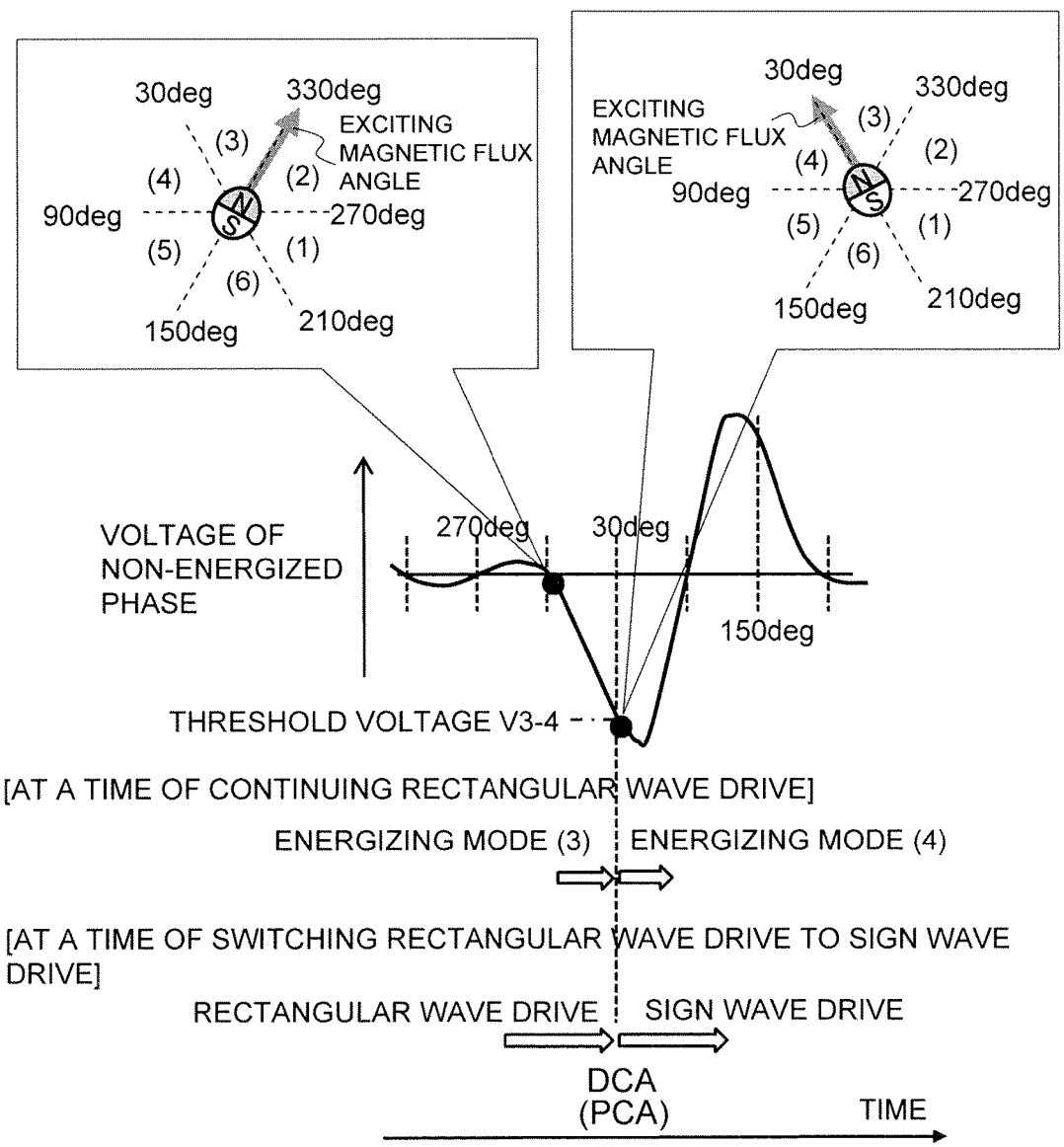
FIG. 3 is a timing chart illustrating an example of angular position at which the drive mode is switched according to an embodiment of the present invention.

In the example illustrated in FIG. 3, angular position DCA at which the switching from rectangular wave drive to sign wave drive is performed is set to match angular position PCA at which switching of output pattern is performed in rectangular wave drive.

In rectangular wave drive, in a case of switching the output pattern (energizing mode) among six output patterns at each angular position PCA of 30 degrees, 90 degrees, 150 degrees, 210 degrees, 270 degrees and 330 degrees, controller 213 compares a detected voltage of a non-energized phase with a threshold voltage that has been set in advance as a voltage of the non-energized phase at each angular position PCA, to determine whether or not the motor is at angular position PCA.

Then, controller 213 performs switching from rectangular wave drive to sign wave drive at any one of angular positions PCA of 30 degrees, 90 degrees, 150 degrees, 210 degrees, 270 degrees and 330 degrees, whichever closest in a positive rotation direction from the angle of the motor at a timing at which motor rotation speed MS becomes higher than predetermined speed LS.

The example illustrated in FIG. 3 is an example in which among six output patterns, a third pattern (third energizing mode) is selected in a 60-degree segment between 330 degrees to 30 degrees, in which a threshold voltage V3-4 is an induced voltage in a non-energized phase at a position of 30 degrees at which switching from third pattern to fourth pattern is to be performed.

Then, at a timing when it is determined that motor rotation speed MS is higher than predetermined speed LS, if the position of the motor is in the 60-degree segment between 330 degrees to 30 degrees, controller 213 waits until the angular position of 30 degrees is detected and thereafter performs the switching from rectangular wave drive to sign wave drive.

As described above, in the rectangular wave drive, when angular position PCA at which switching of output pattern is performed is made to match angular position DCA at which switching from rectangular wave drive to sign wave drive is performed, it is not necessary to independently detect the angle at which the switching from rectangular wave drive to sign wave drive is performed, and accordingly, the control can be simplified.

Figure 4:
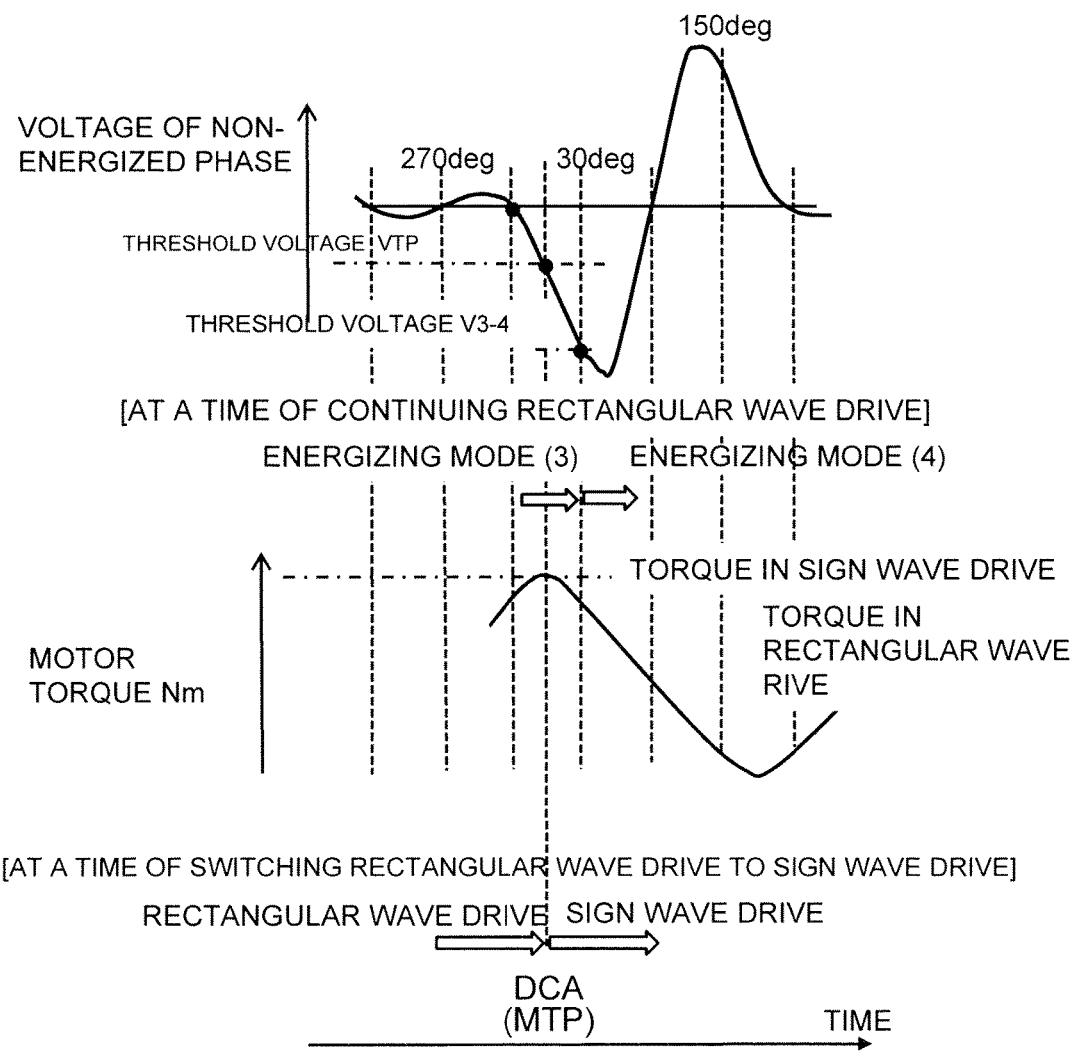
FIG. 4 is a timing chart illustrating an example of angular position at which the drive mode is switched according to an embodiment of the present invention.

FIG. 4 illustrates another example of detection of angular position DCA by controller 213 in step S204.

In the example illustrated in FIG. 4, angular position DCA at which switching from rectangular wave drive to sign wave drive is performed is determined according to a motor torque in the rectangular wave drive, and in more detail, angular position DCA is set at an angular position MTP at which the motor torque is at a peak value (maximum value).

In rectangular wave drive, motor torque variation occurs, and thus, there is a possibility that a motor torque at angular position PCA at which switching of output pattern (energizing mode) is performed is lower than a motor torque in a sign wave drive state.

In a sign wave drive control, controller 213 estimates an axial error between a motor rotor axis and a control system axis from a voltage and a current applied to the motor, and while adjusting the voltage and the current applied to the motor so that the estimated axial error becomes a predetermined value, controller 213 performs PWM control of switching elements constituting an inverter based on a frequency that is a speed instruction.

Figure 5A:
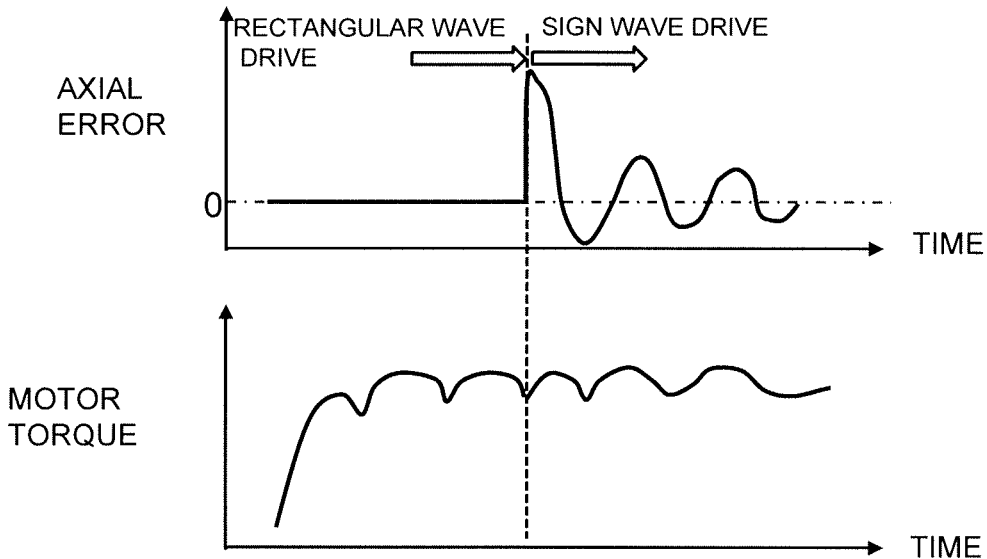
FIGS. 5A and 5B are timing charts illustrating actuation according to an embodiment of the present invention.

In such a sign wave drive control, if switching from rectangular wave drive to sign wave drive is performed in a state that the motor torque is lower than a motor torque produced in the sign wave drive, as illustrated in FIG. 5A, an axial error occurs at a time t1 that is a switching timing to sign wave drive.

Depending on a gain of PLL (Phase Locked Loop) control, such an axial error occurs at an early timing after start of sign wave drive, and as illustrated in FIG. 5A, on and after a time t1, that is a time after the switching to sign wave drive, the estimated value of the axial error may undergo a hunting to cause a torque hunting, and in the worst case, loss of synchronism of brushless motor 1 may occurs.

For example, when brushless motor 1 is a motor for driving an electric oil pump, since a motor load changes depending on an oil temperature, it is not possible to ensure tracking of control depending on the setting of PLL gain and thus, loss of synchronism of brushless motor 1 may occurs.

Figure 5B:
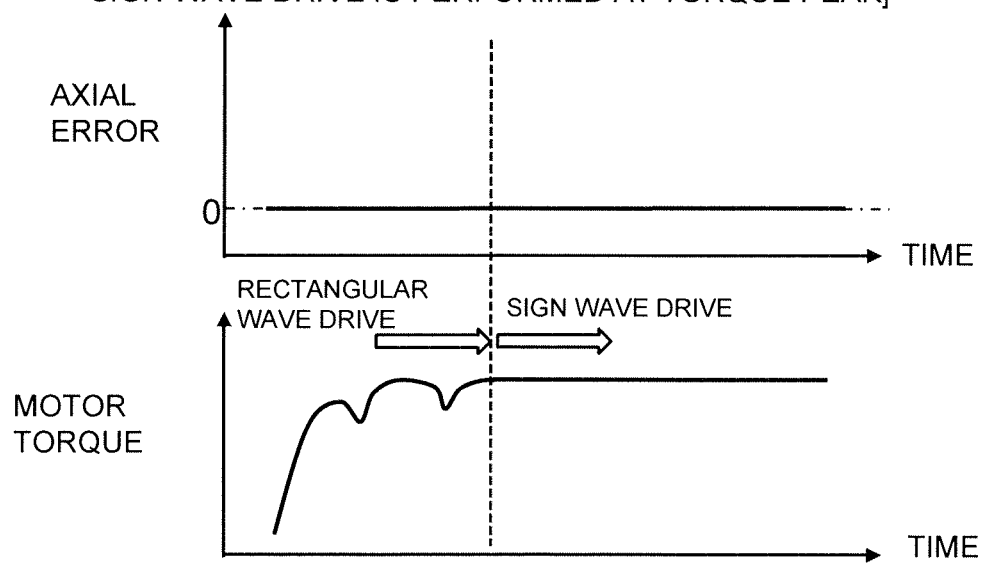

In the example illustrated in FIG. 4, controller 213 performs the switching from rectangular wave drive to sign wave drive at angular position MTP at which the motor torque is at a peak value in the rectangular wave drive, so that as illustrated in FIG. 5B, the axial error at the start of sign wave drive becomes close to 0 degrees to suppress occurrence of hunting and further, occurrence of loss of synchronism.

In FIG. 5B, the switching from rectangular wave drive to sign wave drive is performed at a time t0 at which the motor torque is at a peak value. In this case, the axial error is maintained to be 0 degrees, so that torque hunting on and after time t0 is suppressed.

Detection of angular position MTP at which the motor torque is at a peak value, as illustrated in FIG. 4, is performed based on a comparison of the voltage of a non-energized phase with a threshold voltage VTP corresponding to angular position MTP. Furthermore, even when the motor rotation speed becomes higher than predetermined speed SL, controller 213 waits subsequent detection of angular position MTP and thereafter performs the switching from rectangular wave drive to sign wave drive.

Here, the angular position of the switching from rectangular wave drive to sign wave drive is not limited to the angular position at which the motor torque is at a peak value, but controller 213 can perform the switching from rectangular wave drive to sign wave drive at an angular position at which the motor torque becomes higher than that at angular position PCA at which switching of output pattern is to be performed in a rectangular wave drive. Also in this case, it is possible to suppress occurrence of torque hunting as compared with the case of performing the switching from rectangular wave drive to sign wave drive at angular position PCA.

That is, by making an angular position at which a higher motor torque than the motor torque at angular position PCA is generated, to be angular position DCA at which the switching from rectangular wave drive to sign wave drive is performed, it is possible to suppress torque hunting as compared with a case of carrying out the switching from rectangular wave drive to sign wave drive at angular position PCA. Furthermore, by making angular position MTP at which the motor torque is at a peak value to be angular position DCA, it is possible to further reduce torque hunting.

Furthermore, in a rectangular wave drive state, detection of angular position MTP at which the motor torque is at a peak value can be performed based on a voltage of a non-energized phase, or based on a detected value of motor current.

Figure 6:
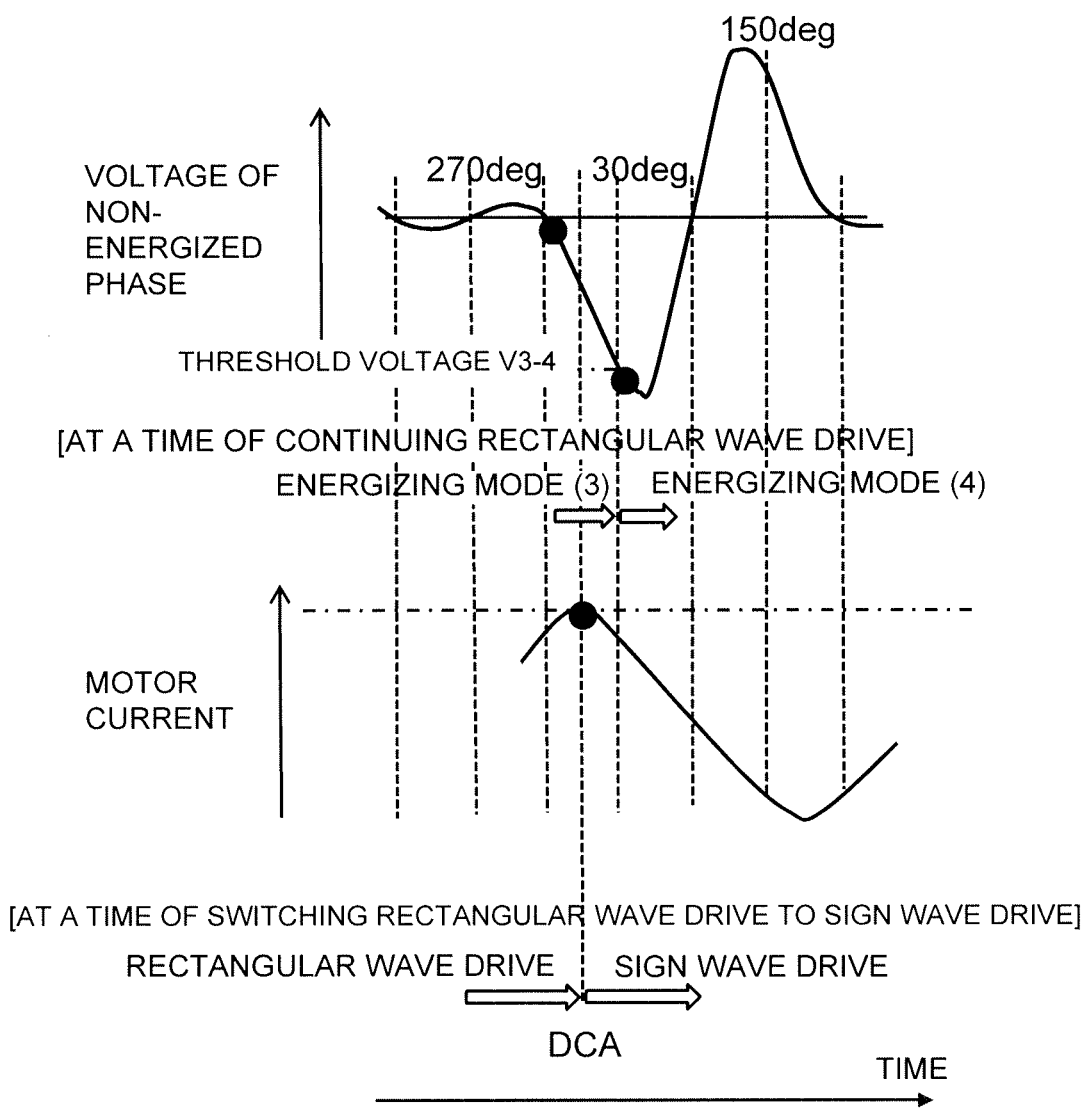
FIG. 6 is a timing chart illustrating an example of angular position at which the drive mode is switched according to an embodiment of the present invention.

There is a correlation between motor torque and motor current, and as illustrated in FIG. 6, the angular position at which the motor current is at a peak value is an angular position at which the motor torque is at a peak value. Accordingly, controller 213 can detect a timing at which the detected value of motor current is at a peak value, and perform switching from rectangular wave drive to sign wave drive at the timing at which the detected value of motor current is at a peak value.

Furthermore, in a case in which brushless motor 1 is a motor for driving an electric oil pump, when the oil temperature is low and motor load is high, there may occur such a case in which even if the drive mode is switched to sign wave drive, the motor rotation speed does not rise and switching between rectangular wave drive and sign wave drive is repeated, thereby causing variation of oil discharge pressure or excessively high motor current in the sign wave drive state.

Therefore, when such repeated switching between rectangular wave drive and sign wave drive occurs, in other words, when the motor load is high and the motor rotation speed does not rise, controller 213 changes the motor rotation speed SL to a value higher than a standard value to thereby suppress switching to sign wave drive.

Thus, when the motor load is so high that the repeated switching between rectangular wave drive and sign wave drive occurs, by suppressing the switching to sign wave drive, it is possible to suppress the repeated switching between rectangular wave drive and sign wave drive, and to suppress variation of oil discharge pressure, and furthermore, it is possible to suppress the motor current to be low so as to protect the drive circuit.

Here, when controller 213 detects that repeated switching between rectangular wave drive and sign wave drive occurs, or when it detects that the motor rotation speed does not rise in sign wave drive, it is possible to change the motor rotation speed SL toward an increasing direction. Furthermore, when brushless motor 1 is a drive source of an electric oil pump, controller 213 may change the motor rotation speed SL toward an increasing direction when the oil temperature becomes low.

Furthermore, brushless motor 1 is not limited to a three-phase brushless motor, and the rectangular wave drive and the sign wave drive are not limited to 120 degree energized type rectangular wave drive and 180 degree energized type sign wave drive, respectively.

The entire contents of Japanese Patent Application No. 2012-207922 filed on Sep. 21, 2012, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

While only a select embodiment has been chosen to illustrate and describe the present invention, it will be apparent to those skilled in the art from this disclosure that various changes and modifications can be made herein without departing from the scope of the invention as defined in the appended claims.

What is claimed is:

1. A sensorless driving apparatus for a brushless motor, comprising:
    a driving circuit; and
    a controller programmed to output drive control signals to the driving circuit to drive the brushless motor in a first drive mode by rectangular waves and drive the brushless motor in a second drive mode by sign waves, detect a motor rotation speed that exceeds a predetermined value, detect a rotor reaching a predetermined angle at a time after the predetermined value has been exceeded, and perform switching from the first drive mode to the second drive mode after reaching the predetermined angle of the rotor of the brushless motor;
    wherein the predetermined angle is an angle of the rotor at which a torque, which varies in accordance with the angle of the rotor, is at a peak value.

2. The sensorless driving apparatus for a brushless motor according to claim 1,
    wherein the predetermined angle is an angle of the rotor at which a current of the brushless motor is at a peak value.

3. The sensorless driving apparatus for a brushless motor according to claim 1,
    wherein the controller detects the predetermined angle based on a voltage of a non-energized phase in a state that the brushless motor is driven by the first drive mode.

4. The sensorless driving apparatus for a brushless motor according to claim 1,
    wherein the predetermined angle is an angle of the rotor at which an energizing pattern is switched by the first drive mode.

5. The sensorless driving apparatus for a brushless motor according to claim 1,
    wherein the predetermined angle is an angle of the rotor at which the torque of the brushless motor is greater than the torque of the brushless motor at an angle of the rotor at which an energizing pattern is switched by the first drive mode.

6. The sensorless driving apparatus for a brushless motor according to claim 1,
    wherein the predetermined angle is between an angle at which an energizing pattern is switched by the first drive mode last time and an angle at which the energizing pattern is switched by the first drive mode next time.

7. The sensorless driving apparatus for a brushless motor according to claim 1,
    wherein the controller performs the switching from the first drive mode to the second drive mode when a rotation speed of the brushless motor is higher than a predetermined speed.

8. The sensorless driving apparatus for a brushless motor according to claim 7,
    wherein the controller changes the predetermined speed to a higher speed when the rotation speed of the brushless motor does not rise in a state that the brushless motor is driven by the second drive mode.

9. The sensorless driving apparatus for a brushless motor according to claim 1,
    wherein the brushless motor is a three-phase brushless motor and the first drive mode switches an energizing pattern among six energizing patterns at every 60 degrees.

10. A sensorless driving apparatus for a brushless motor, comprising:
    a drive means for driving the brushless motor in a first mode by rectangular waves and driving the brushless motor in a second mode by sign waves; and
    switching means for detecting a motor rotation speed that exceeds a predetermined value, detecting a rotor reaching a predetermined angle at a time after the predetermined value has been exceeded, and performing switching from the first mode to the second mode after reaching the predetermined angle of the rotor of the brushless motor;
    wherein the predetermined angle is an angle of the rotor at which a torque, which varies in accordance with the angle of the rotor, is at a peak value.

11. A sensorless driving method for a brushless motor, comprising the following steps of:
    detecting a motor rotation speed that exceeds a predetermined value;

detecting whether or not an angle of a rotor of the brushless motor is a predetermined angle at a time after the predetermined value has been exceeded; and switching drive of the brushless motor from rectangular wave drive mode to sign wave drive mode after the angle of the rotor of the brushless motor has reached the predetermined angle;

wherein the step of detecting whether or not the angle of the rotor of the brushless motor is the predetermined angle includes the step of detecting whether or not the angle of the rotor is an angle at which the torque, which varies in accordance with the angle of the rotor, is at a peak value.

12. The sensorless driving method for a brushless motor according to claim 11, wherein the step of detecting whether or not the angle of the rotor of the brushless motor is the predetermined angle includes the step of detecting whether or not the angle of the rotor is an angle at which the current of the brushless motor is at a peak value.

13. The sensorless driving method for a brushless motor according to claim 11, wherein the step of detecting whether or not the angle of the rotor of the brushless motor is the predetermined angle includes the step of detecting a voltage of a non-energized phase in a state that the brushless motor is driven by the rectangular wave drive mode, and the step of comparing the voltage of the non-energized phase with a threshold value.

14. The sensorless driving method for a brushless motor according to claim 11, wherein the step of detecting whether or not the angle of the rotor of the brushless motor is the predetermined angle includes the step of detecting an angle of the rotor at which an energizing pattern is switched in the rectangular wave drive mode.

15. The sensorless driving method for a brushless motor according to claim 11, wherein the step of detecting whether or not the angle of the rotor of the brushless motor is the predetermined angle includes the step of detecting an angle of the rotor at which a first torque of the brushless motor is greater than a second torque of the brushless motor at an angle of the rotor at which an energizing pattern in the rectangular wave drive mode is switched.

16. The sensorless driving method for a brushless motor according to claim 11, wherein the step of detecting whether or not the angle of the rotor of the brushless motor is the predetermined angle includes the step of detecting an angle of the rotor between an angle at which an energizing pattern is switched last time and an angle at which an energizing pattern is switched next time in the rectangular wave drive mode.

17. The sensorless driving method for a brushless motor according to claim 11, wherein the step of switching from the rectangular wave drive mode to the sign wave drive mode includes the step of detecting whether or not a rotation speed of the brushless motor is higher than a predetermined speed, and the step of switching drive of the brushless motor from the rectangular wave drive mode to the sign wave drive mode when the rotation speed of the brushless motor is higher than the predetermined speed and the angle of the rotor of the brushless motor is the predetermined angle.

18. The sensorless driving method for a brushless motor according to claim 17, further comprising the step of changing the predetermined speed to a higher speed when the rotation speed of the brushless motor does not rise in the sign wave drive mode.

* * * * *